(12) United States Patent
Nakagawa

(10) Patent No.: US 10,752,048 B2
(45) Date of Patent: Aug. 25, 2020

(54) WHEEL MOUNTING STRUCTURE

(71) Applicant: TOYOTA JIDOSHA KABUSHIKI KAISHA, Toyota-shi, Aichi-ken (JP)

(72) Inventor: Kenji Nakagawa, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 308 days.

(21) Appl. No.: 15/945,814

(22) Filed: Apr. 5, 2018

(65) Prior Publication Data

US 2018/0297398 A1 Oct. 18, 2018

(30) Foreign Application Priority Data

Apr. 18, 2017 (JP) .................................. 2017-081752

(51) Int. Cl.
*B60B 7/00* (2006.01)
*B60B 23/04* (2006.01)
(Continued)

(52) U.S. Cl.
CPC ............ *B60B 7/0013* (2013.01); *B60B 23/04* (2013.01); *B60B 23/10* (2013.01); *B60B 25/20* (2013.01); *B60B 27/001* (2013.01); *B60B 2900/111* (2013.01); *F16C 33/581* (2013.01); *F16C 2326/02* (2013.01)

(58) Field of Classification Search
CPC ........... B60B 3/14; B60B 3/16; B60B 7/0013; B60B 23/04; B60B 27/00; B60B 27/0005; B60B 27/001; B60B 27/0052
See application file for complete search history.

(56) References Cited

U.S. PATENT DOCUMENTS 3,893,690 A * 7/1975 Yapp ...................... B60B 7/002
301/108.3
5,988,324 A * 11/1999 Bertetti ............... B60B 27/0005
188/18 A
(Continued)

FOREIGN PATENT DOCUMENTS

JP 59-111701 U 7/1984
JP 03-044001 U 4/1991
(Continued)

OTHER PUBLICATIONS

Office Action dated Jul. 14, 2020 in JP Application No. 2017-081752.

*Primary Examiner* — Jason R Bellinger
(74) *Attorney, Agent, or Firm* — Sughrue Mion, PLLC

(57) ABSTRACT

A spigot joint part of a wheel hub has a cylindrical outer peripheral surface. The wheel mounting structure includes a collared member having a collar part to be press-fitted into and fixed to the spigot joint part, which is formed at a position away from an end part of the spigot joint part by a predetermined distance to protrude outward in a radial direction of the collared member. An annular protruding part is formed on a part of an inner peripheral surface of a center hole of a wheel to protrude toward a center of the wheel. In a state where the wheel is fixed to the flange part by using hub bolts, a fitting part and the annular protruding part are spigot-fitted. In a state where the hub bolts are removed, the annular protruding part is locked by the collar part.

13 Claims, 10 Drawing Sheets

(51) Int. Cl.
    *B60B 25/20*    (2006.01)
    *B60B 23/10*    (2006.01)
    *B60B 27/00*    (2006.01)
    *F16C 33/58*    (2006.01)

(56) References Cited

U.S. PATENT DOCUMENTS

| | | | |
|---|---|---|---|
| 6,217,220 | B1* | 4/2001 | Ohkuma ............... B60B 27/00 301/108.1 |
| 6,286,909 | B1* | 9/2001 | Mizukoshi .......... B60B 27/0042 301/105.1 |
| 6,318,533 | B1* | 11/2001 | Krisher ................ B60K 17/306 180/247 |
| 10,093,126 | B2* | 10/2018 | Weigand ............... B60B 7/0013 |
| 2003/0094849 | A1* | 5/2003 | Joki ..................... F16C 19/364 301/105.1 |
| 2013/0292996 | A1 | 11/2013 | Yokota et al. |
| 2018/0257425 | A1* | 9/2018 | Nakagawa .............. B60B 3/008 |

FOREIGN PATENT DOCUMENTS

| | | |
|---|---|---|
| JP | 2011-102100 A | 5/2011 |
| JP | 2012-148643 A | 8/2012 |

\* cited by examiner

WHEEL MOUNTING STRUCTURE

BACKGROUND OF THE INVENTION

1. Field of the Invention

The present invention relates to a wheel mounting structure which is configured to mount a wheel for a vehicle to a wheel hub by spigot fitting.

2. Description of the Related Art

Hitherto, there is known a wheel rolling bearing device (hereinafter also referred to as "conventional device") including a plurality of wheel mounting bolts provided to a wheel hub, which has a structure for fixing the wheel to the wheel hub by fastening of fastening nuts (hub nuts) to the bolts (for example, refer to Japanese Patent Application Laid-open (Kokai) No. 2012-148643, see FIG. 1). In contrast, a wheel rolling bearing device having a plurality of wheel fixing bolt holes (tapped holes) formed in the wheel hub, which has a structure for fixing the wheel to the wheel hub by fastening of fastening bolts (hub bolts) into the bolt holes has an advantage of being lightweight as compared to the related-art device.

In many cases, for the wheel hub and the wheel mounted to the wheel hub of the above-mentioned device, a spigot-fitting structure is employed so as to facilitate positional alignment of the wheel hub and the wheel. The spigot-fitting structure is a structure in which an outer peripheral surface of a cylindrical protruding part which protrudes coaxially with the wheel hub from a vehicle outer side of the wheel hub to the vehicle outer side and an inner peripheral surface of a hole formed in a center of the wheel are brought into abutment against each other.

In a spigot fitting part having the structure described above, when the wheel hub and/or the wheel corrodes, the wheel hub and the wheel are liable to adhere/stick to each other. Therefore, a fitting part between the wheel hub and the wheel is formed on a distal end side of the protruding part in a direction of a rotation axis of the wheel hub. At the same time, a length of the fitting part in the direction of the rotation axis is set small. In this manner, the wheel can be relatively easily removed from the wheel hub.

In a case in which all the hub nuts are removed from the wheel hub of the wheel rolling bearing device having the structure of fastening with the plurality of hub nuts, even when the fitting at the spigot fitting part is released/cancelled, the wheel is less liable to fall off because the wheel is supported by the bolts protruding from the wheel hub. Meanwhile, in a case in which all the hub bolts are removed from the wheel hub of the wheel rolling bearing device having the structure for achieving fastening with the plurality of hub bolts, the wheel is supported at the spigot fitting part. However, when the fitting at the spigot fitting part is released, the wheel falls off.

In order to prevent intrusion of rainwater or puddle water into the wheel hub, there exists a vehicle including a grease cap mounted to the cylindrical protruding part having the spigot-fitting structure. In a case in which the wheel hub used in the vehicle described above is a wheel hub having a structure for fixing the wheel by fastening the plurality of hub bolts, even when the fitting at the spigot fitting part is released, and the wheel falls off the spigot fitting part, the wheel is temporarily supported by the grease cap. However, a typical wheel and a typical grease cap do not have a structure for locking to each other. Therefore, the wheel, which has temporarily been supported by the grease cap, then falls off the grease cap. At this time, there is a fear of damaging the wheel. Further, when the wheel falls off, there is a fear in that the wheel and a brake component may collide against each other to damage the brake component. As a result, there is a fear of increasing the number of steps in wheel replacement work. As described above, the wheel hub having the structure for fixing the wheel by fastening the plurality of hub bolts has a problem in that efficiency and reliability of the wheel replacement work are liable to be degraded.

SUMMARY OF THE INVENTION

The present invention has been made to solve the problem described above. Specifically, one object of the present invention is to provide a wheel mounting structure capable of preventing a wheel from failing off and/or preventing components from being damaged during wheel replacement to improve efficiency of the wheel replacement work for a wheel hub which has a structure for fixing the wheel by fastening hub bolts and has a grease cap mounted thereto.

The wheel mounting structure (hereinafter also referred to as "present invention device") according to one embodiment of the present invention is a structure configured to mount a wheel (50) to a wheel hub (20) for a vehicle.

The wheel hub includes: a hub axle part (21): a flange part (22) being a disc-shaped part extending from the hub axle part in parallel to a plane perpendicular to a rotation axis (90) of the wheel hub, the flange part having a fixing surface (22a) configured to fix the wheel by using a plurality of hub bolts (60) on a vehicle-body outer side of the vehicle; and a spigot joint part (23) being a part having a cylindrical shape with the rotation axis as a center axis, which is formed to protrude from the hub axle part to the vehicle-body outer side with respect to the flange part.

The spigot joint part has a cylindrical outer peripheral surface (23b) with the rotation axis as a center axis and a cylindrical inner peripheral surface (230 with the rotation axis as a center axis. A collared member (70) being a member having a cylindrical shape, which has a collar part (72) formed to protrude outward in a radial direction of the collared member, is inserted into and fixed to the cylindrical inner peripheral surface from the vehicle-body outer side. The collar part is formed at a position separated from an end part (23d) of the spigot joint part by a predetermined distance (Wg1) when the collared member is inserted into and fixed to the spigot joint part.

The wheel has: a center hole (52) formed in a center of the wheel to allow the spigot joint part to be inserted therethrough, a plurality of bolt holes (53) formed around the center hole to allow the plurality of hub bolts to be inserted therethrough; and an annular protruding part (54) formed on a part of an inner peripheral surface of the center hole, which is positioned on a hub mounting surface (51a) side of the wheel, to protrude toward the center of the wheel.

Further, a fitting part (24) having the cylindrical outer peripheral surface and the annular protruding part (54) are spigot-fitted in a state where the wheel is fixed to the flange part by using the plurality of hub bolts. The annular protruding part (54) is locked by the collar part (72) in a state where the fixing of the wheel by using the plurality of hub bolts is released.

According to the configuration described above, in the state where the wheel is fixed to the flange part by using the plurality of hub bolts, the annular protruding part and the fitting part function as a spigot fitting part. In the state where the fixing of the wheel with the plurality of hub bolts is released, specifically, in the state where all the hub bolts are removed, the wheel is supported at the spigot fitting part. However, as described above, the spigot fitting part is designed so as to be easily released, and hence it is difficult to support the wheel only with a supporting force provided by the spigot fitting part. Therefore, when all the hub bolts are removed, the wheel is inclined so that the annular protruding part is released from the fitting part to be locked by the collar part of the collared member. In this manner, the annular protruding part and the collared member having the collar part function as a wheel fall-off prevention part. Therefore, according to the structure of one embodiment of the present invention, the wheel can be prevented from falling off, and/or the components are prevented from being damaged during the wheel replacement, thereby being capable of improving efficiency of the wheel replacement work.

In the wheel mounting structure according to one aspect of the present invention, the predetermined distance may be set so as to be equal to a length (sum LT of lengths Lb, La, and Lc) of the annular protruding part (54) in a direction of the rotation axis.

According to this aspect of he present invention, when all the hub bolts are removed, the annular protruding part is brought into abutment against the cylindrical surface and the collar part of the collared member (see FIG. 6). In this manner, the annular protruding part is reliably locked by the collar part, thereby being capable of effectively preventing the wheel from falling off.

In the wheel mounting structure according to one aspect of the present invention, a stepped part (23h) may be formed at a vehicle-body inner side end of the cylindrical inner peripheral surface, and the predetermined distance may be set by bringing an end part (74) of the collared member into abutment against the stepped part.

According to this aspect of the present invention, the end part of the collared member is brought into abutment against the stepped part. With this configuration, a depth to which the collared member is inserted into the spigot joint part is restricted, and the above-mentioned predetermined distance from the end part of the spigot joint part to the collar part is determined. In this manner, during assembly and maintenance of the wheel hub and other works, the above-mentioned predetermined distance can be reliably reproduced.

In the wheel mounting structure according to one aspect of the present invention, the collared member may be press-fitted into and fixed to the cylindrical inner peripheral surface.

According to this aspect of the present invention, the collared member can be easily mounted to the spigot joint part.

In the wheel mounting structure according to one aspect of the present invention, the collared member may be a grease cap.

In the descriptions given above, in order to facilitate understanding of the present invention, names and/or reference symbols used in embodiments of the present invention described below are enclosed in parentheses, and are assigned to elements of the invention corresponding to the embodiments. However, the respective elements of the present invention are not limited to the embodiments defined by the names and/or the reference symbols. Other objects, other features, and accompanying advantages of the present invention are readily understood from a description of the embodiments of the present invention to be given referring to the following drawings.

DESCRIPTION OF THE EMBODIMENTS

First Embodiment (Configuration)

A wheel mounting structure (hereinafter also referred to as "first structure") according to a first embodiment of the present invention will be described below referring to the accompanying drawings.

Figure 1:
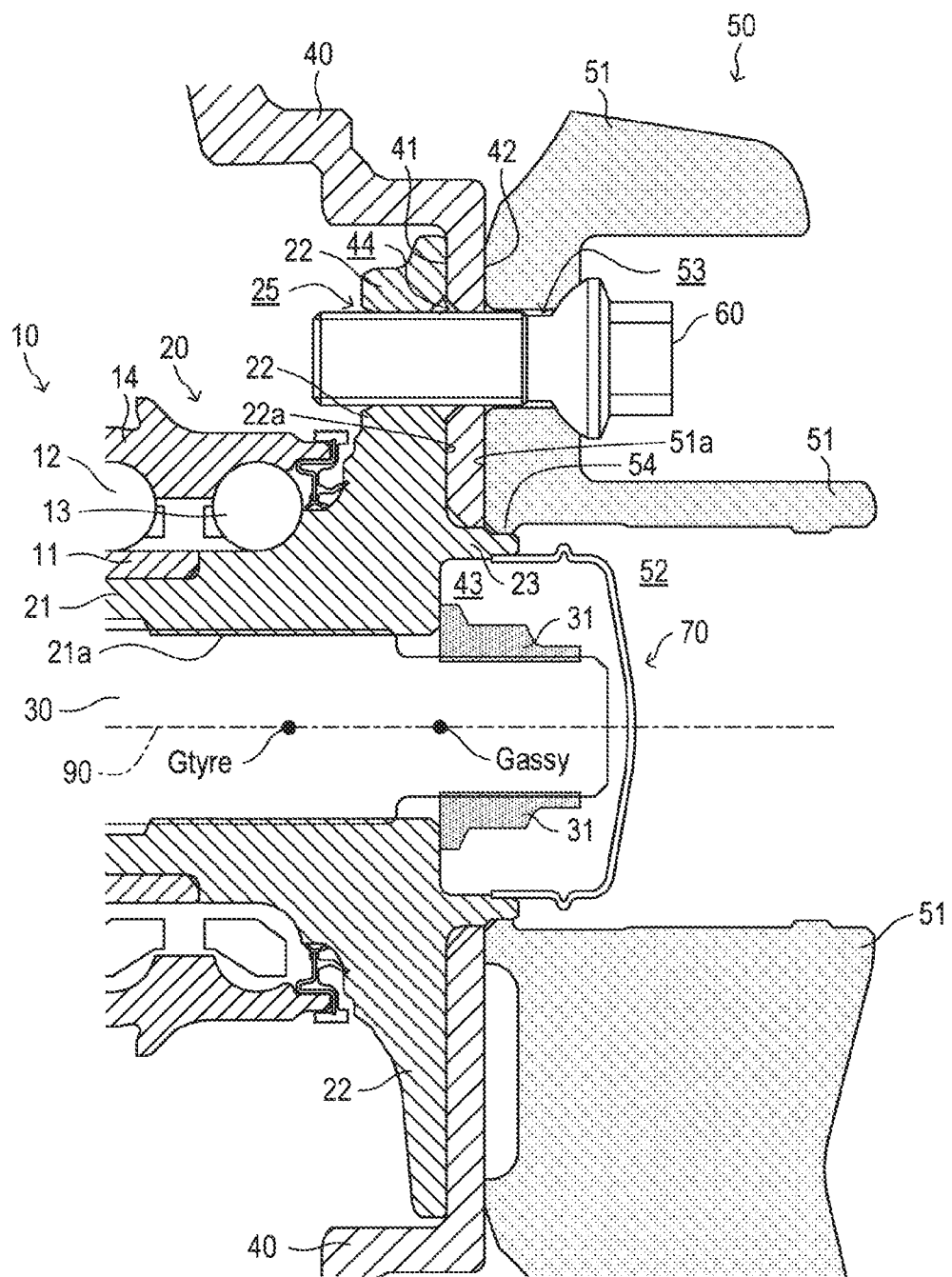
FIG. 1 is a sectional view for describing a wheel mounting structure (first structure) according to a first embodiment of the present invention.

In FIG. 1, there are illustrated a wheel rolling bearing device 10, a wheel hub 20, a drive shaft 30, a disc rotor 40, a wheel 50, hub bolts 60, a grease cap (hereinafter also referred to as "collared member") 70, and other components. FIG. 1 is a sectional view taken along a rotation axis 90 of the wheel hub 20 in a state where the wheel 50 is mounted to the wheel hub 20 of the wheel rolling bearing device 10. In the following description, an "outboard side" indicates a side toward an outside of a vehicle in a direction of the rotation axis 90 (right side in FIG. 1), and an "inboard side" indicates a side toward a center of the vehicle in the direction of the rotation axis 90 (left side in FIG. 1).

The wheel rolling bearing device 10 includes an inner ring 11, double-row rolling elements 12 and 13, an outer ring 14, and the wheel hub 20. A structure of the wheel rolling bearing device 10 is well known, and is disclosed in Japanese Patent Application Laid-open (Kokai) No. 2008-56122 and Japanese Patent Application Laid-open (Kokai) No. 2008-247274, which are incorporated by reference in the specification of this application by reference.

The wheel hub 20 includes a hub axle part 21, a flange part 22, and a spigot joint part 23. The wheel hub 20 is formed by integrally molding the hub axle part 21, the flange part 22, and the spigot joint part 23.

The hub axle part 21 has an inner peripheral surface 21a having a spline (not shown), and is spline-coupled to the drive shaft 30. The hub axle part 21 is fastened to the drive shaft 30 by a drive-shaft fastening nut 31 and is fixed to the drive shaft 30 so as to be rotatable integrally with the drive shaft 30.

The flange part 22 is an approximately disc-shaped part extending from the hub axle part 21 in parallel to a plane perpendicular to the rotation axis 90 of the hub axle part 21. The flange part 22 has a fixing surface 22a having a circular shape to be brought into abutment against a mounting surface 41 of the disc rotor 40. Further, the flange part 22 has a plurality of bolt holes (tapped holes) 25 for fastening the hub bolts 60 therein. In FIG. 1, only one of the plurality of bolt holes 25 is illustrated.

The spigot joint part 23 is a part having an approximately cylindrical shape with the rotation axis 90 as a center axis, which protrudes from the hub axle part 21 to the outboard side with respect to the flange part 22. The spigot joint part 23 is spigot-fitted into a hole (center bore 52) formed in the center of the wheel 50, as described later.

The disc rotor 40 is a member for braking a vehicle and is sandwiched between the flange part 22 and the wheel 50. The disc rotor 40 has the mounting surface 41, an abutting surface 42, and a hub mounting hole 43. The mounting surface 41 is brought into abutment against the fixing surface 22a of the flange part 22. The abutting surface 42 is brought into abutment against the wheel 50. The hub mounting hole 43 for inserting the spigot joint part 23 therethrough is formed in the center of the disc rotor 40. Further, bolt holes 44 for inserting the hub bolts 69 therethrough are formed around the hub mounting hole 43 at equal intervals on a circle being concentric with the hub mounting hole 43.

The wheel 50 has a hub mounting part 51. In a center of the hub mounting part 51, a center hole (hereinafter also referred to as "center bore") 52 which is a hole for inserting the spigot joint part 23 therethrough is formed. A plurality of bolt holes 53 being holes for inserting the hub bolts 60 therethrough are formed in the hub mounting part 51 around the center bore 52 at equal intervals on a circle being concentric with the center bore 52.

Further, the hub mounting part 51 has a hub mounting surface 51a on the inboard side, which is brought into abutment against the abutting surface 42 of the disc rotor 40. An annular protruding part 54 is formed to protrude from a part of an inner peripheral surface of the center bore 52, which is positioned on the hub mounting surface 51a side, toward the center of the wheel 50.

The hub bolts 60 are fastened into the plurality of bolt holes 52 formed in the flange part 22, thereby fixing the disc rotor 40 and the wheel 50 to the wheel hub 20.

Figure 2:
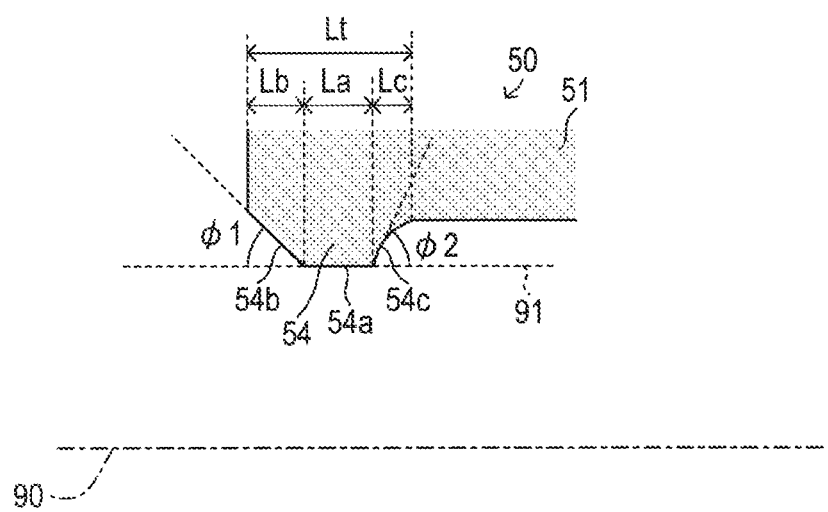
FIG. 2 is an enlarged sectional view of an annular protruding part illustrated in FIG. 1.

As illustrated in FIG. 2, on a top of the annular protruding part 54 formed to protrude from the hub mounting part 51 of the wheel 50, a flat part 54a which is parallel to the rotation axis 90 is formed. A length (thickness) La of the flat part (hereinafter also referred to as "protruding-part inner peripheral surface") 54a in the direction of the rotation axis 90 is, for example, 3 mm. An inboard-side end of the protruding-part inner peripheral surface 54a of the annular protruding part 54 is chamfered so as to be tapered toward the inboard side. An inclination angle φ1 (angle formed with a line 91 parallel to the rotation axis 90) of a chamfered part (hereinafter also referred to as "first side surface") 54b is, for example, 45°. An outboard-side end of the protruding-part inner peripheral surface 54a of the annular protruding part 54 is chamfered so as to be tapered toward the outboard side. An inclination angle φ2 (angle formed with the line 91 which is parallel to the rotation axis 90) of a chamfered part (hereinafter also referred to as "second side surface") 54c is, for example, 65°.

<Structure of Spigot Fitting Part>

Next, a structure of a spigot fitting part will be described.

Figure 3:
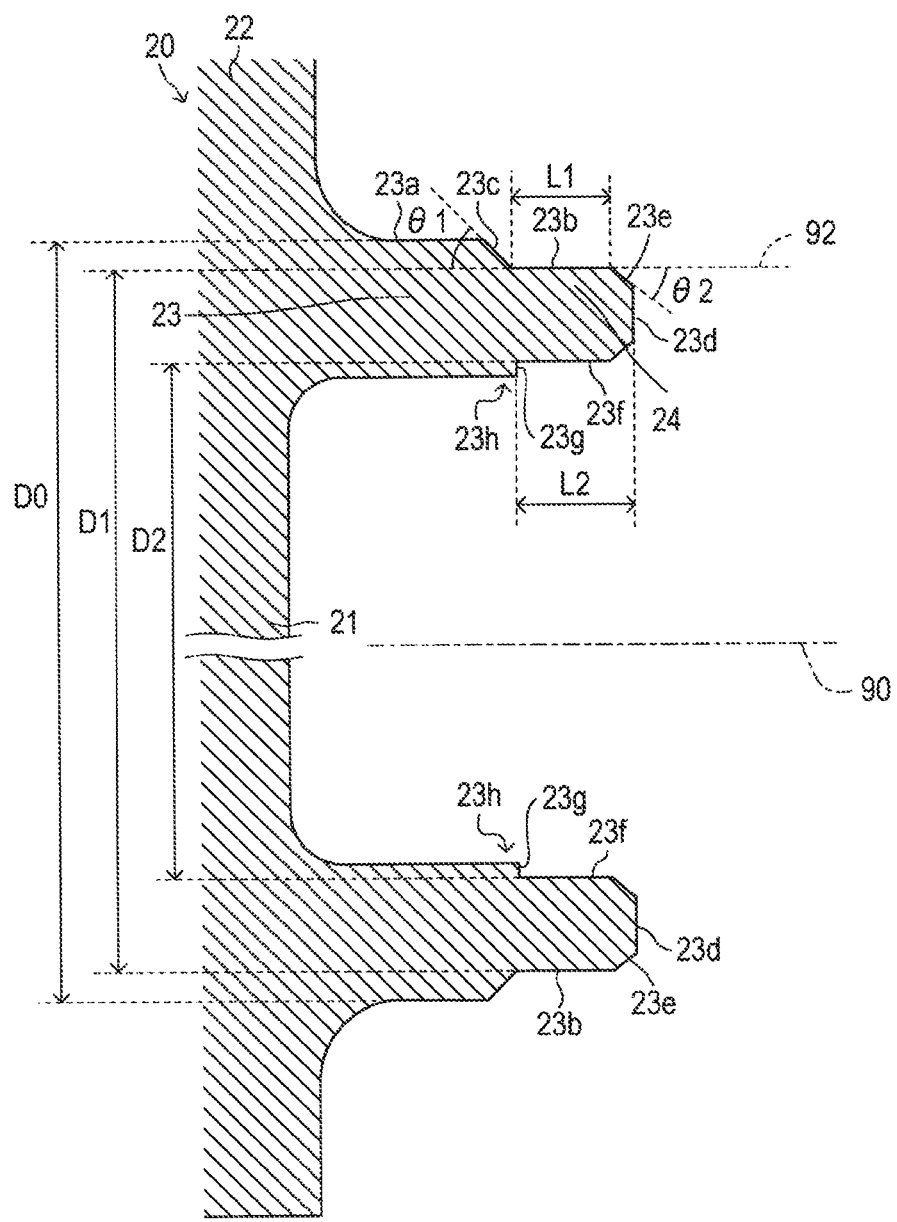
FIG. 3 is an enlarged sectional view of a spigot joint part illustrated in FIG. 1.

As illustrated in FIG. 3, the spigot joint part 23 has two cylindrical outer peripheral surfaces (hereinafter also referred to simply as "outer peripheral surfaces") 23a and 23b having different diameters. An inboard-side outer peripheral surface has a large diameter, and an outboard-side outer peripheral surface has a small diameter. The outer peripheral surface 23a on the inboard side, specifically, on a side closer to the flange part 22 serves as a mounting surface for the disc rotor 40 and is also referred to as "disc-rotor mounting outer peripheral surface 23a".

Figure 4:
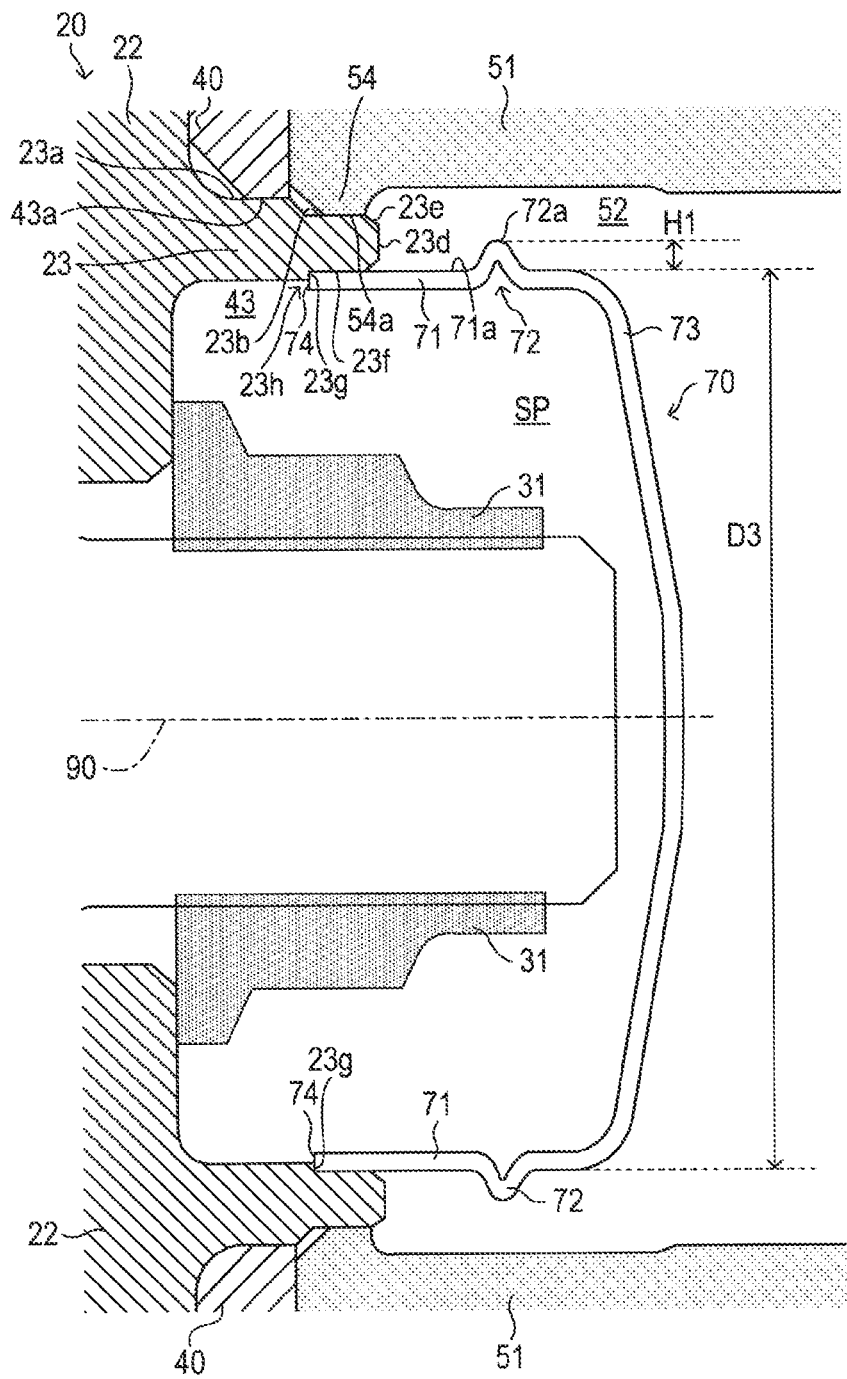
FIG. 4 is an enlarged sectional view of the spigot joint part, the annular protruding part, and a grease cap illustrated in FIG. 1.

The disc-rotor mounting outer peripheral surface 23a is brought into abutment against an inner peripheral surface 43a of the hub mounting hole 43 which is formed in the center of the disc rotor 40 (see FIG. 4).

The outer peripheral surface on the outboard side is referred to as "cylindrical outer peripheral surface 23b". The cylindrical outer peripheral surface 23b is brought into abutment against the protruding-part inner peripheral surface 54a of the annular protruding part 54 (see FIG. 4). Specifically, the cylindrical outer peripheral surface 23b and the protruding-part inner peripheral surface 54a are spigot-fitted. A length L1 of the cylindrical outer peripheral surface 23b in the direction of the rotation axis 90 is, for example, 4 mm. As described above, the length La of the protruding-part inner peripheral surface 54a in the direction of the rotation axis 90 is, for example, 3 mm. As is understood from FIG. 4, the length L1 of the cylindrical outer peripheral surface 23b in the direction of the rotation axis 90 completely covers the length La of the protruding-part inner peripheral surface 54a in the direction of the rotation axis 90. Therefore, a length of an abutting part (hereinafter also referred to as "abutting-part length") between the cylindrical outer peripheral surface 23b and the protruding-part inner peripheral surface 54a in the direction of the rotation axis 90 is 3 mm, which is the same as the length La of the protruding-part inner peripheral surface 54a in the direction of the rotation axis 90. As the abutting-part length becomes longer, the wheel 50 is more stably retained. However, when a surface of the wheel hub 20 and/or a surface of the wheel 50 corrodes, the wheel hub 20 and the wheel 50 are more liable to stick to each other. In view of the stability in retention and ease of removal described above, the abutting-part length is suitably set to fall within a range of from 2 mm to 3 mm.

Referring back to FIG. 3, a diameter D1 of a part (hereinafter also referred to as "fitting part 24") having the cylindrical outer peripheral surface 23b is smaller than a diameter D0 of a part having the disc-rotor mounting outer peripheral surface 23a. The diameter D0 is, for example, 68.6 mm. The diameter D1 is, for example, 66.5 mm. Therefore, an inner diameter of the protruding-part inner peripheral surface 54a of the annular protruding part 54, which is spigot-fitted over the cylindrical outer peripheral surface 23b is approximately 66.5 mm, more precisely, for example, 66.6 mm which is slightly larger than the diameter D1. As described above, the inner diameter of the protruding-part inner peripheral surface 54a is smaller than the diameter D0. Therefore, the wheel 50 is not fitted to reach the disc-rotor mounting outer peripheral surface 23a.

An inclination angle (angle formed with a line 92 parallel to the rotation axis 90) θ1 of a slope (hereinafter also referred to as "first slope") 23c which connects the disc-rotor mounting outer peripheral surface 23a and the cylindrical outer peripheral surface 23b is, for example, 45° which is the same as the inclination angle φ1 of the first side surface 54b.

An inclination angle (angle formed with the line 92 parallel to the rotation axis 90) θ2 of a slope (hereinafter also referred to as "second slope") 23e which connects the cylindrical outer peripheral surface 23b and an end part 23d (hereinafter also referred to as "mating-part end 23d") of the spigot joint part 23 is, for example, 40°.

A cylindrical inner peripheral surface 23f having the rotation axis 90 as a center axis is formed on an inner periphery of the spigot joint part 23. The cylindrical inner peripheral surface 23f is formed on the outboard side of the spigot joint part 23. A surface 23g perpendicular to the rotation axis 90 is formed at an inboard-side end of the cylindrical inner peripheral surface 23f. The surface 23g perpendicular to the rotation axis 90 is brought into abutment against the grease cap 70 when the grease cap 70 is press-fitted, and is therefore also referred to as "abutting surface 23g". A length of the cylindrical inner peripheral surface 23l in the direction of the rotation axis 90, specifically, a length L2 from the mating-part end 23d to the abutting surface 23g is, for example, 5 mm. A stepped part defined by the cylindrical inner peripheral surface 23f and the abutting surface 23g is hereinafter also referred to as "stepped part 23h". An inner diameter D2 of the cylindrical inner peripheral surface 23f is, for example, 60 mm.

As illustrated in FIG. 4, the grease cap 70 is a member having a cylindrical shape and includes a cylindrical part 71, a collar part 72, and a lid part 73. The grease cap 70 is formed of a molten zinc-coated steel plate and is formed by press working. Further, the grease cap 70 is coated with epoxy resin-based coating. The grease cap 70 has the collar part 72 formed to protrude outward in a radial direction of the cylindrical part 71 from an outer peripheral surface (hereinafter also referred to as "cap outer peripheral surface") 71a of the cylindrical part 71. A diameter D3 of the grease cap 70 is approximately equal (for example, 60 mm) to the inner diameter D2 of the cylindrical inner peripheral surface 23f. The lid part 73 is formed on the outboard side of the grease cap 70 by integral molding with the cylindrical part 71. A height H1 of the collar part 72 (length along the radial direction of the cylindrical part 71 from the cap outer peripheral surface 71a to a top part 72a of the collar part 72) is 2.5 mm.

As illustrated in FIG. 4, the grease cap 70 is press-fitted and fixed along the cylindrical inner peripheral surface 23f of the spigot joint part 23. When the grease cap 70 is press-fitted, an inboard-side end part 74 (hereinafter also referred to as "cap end 74") of the grease cap 70 is brought into abutment against the abutting surface 23g of the spigot joint part 23. By the abutment of the cap end 74 against the abutting surface 23g, specifically, by the stepped part 23h, a press-fit depth (length in the direction of the rotation axis 90) of the grease cap 70 is restricted. The press-fit depth of the grease cap 70 is 5 mm which is equal to the length L2 of the cylindrical inner peripheral surface 23f.

When the grease cap 70 is press-fitted into and fixed to the spigot joint part 23, a space SP inside the spigot joint part 23, which includes the drive-shaft fastening nut 31, is hermetically sealed by the grease cap 70. In this manner, intrusion of rainwater into the space SP can be prevented.

Numerical values for the dimensions (lengths L1, L2, and La, the abutting-part length, the diameters D0 to D3, and the diameter of the protruding-part inner peripheral surface 54a) and the angles (inclination angles φ1 and φ2, the first inclination angle φ1, and the second inclination φ2) described above and other elements are merely exemplifications for aid in understanding of the present invention and do not intend to limit the present invention. The above-mentioned numerical values may be suitably changed within a scope of the present invention.

(Operations)

Next, operations of the embodiment according to the present invention are described referring to the drawings for illustrating a state where the hub bolts 60 are removed.

Figure 5:
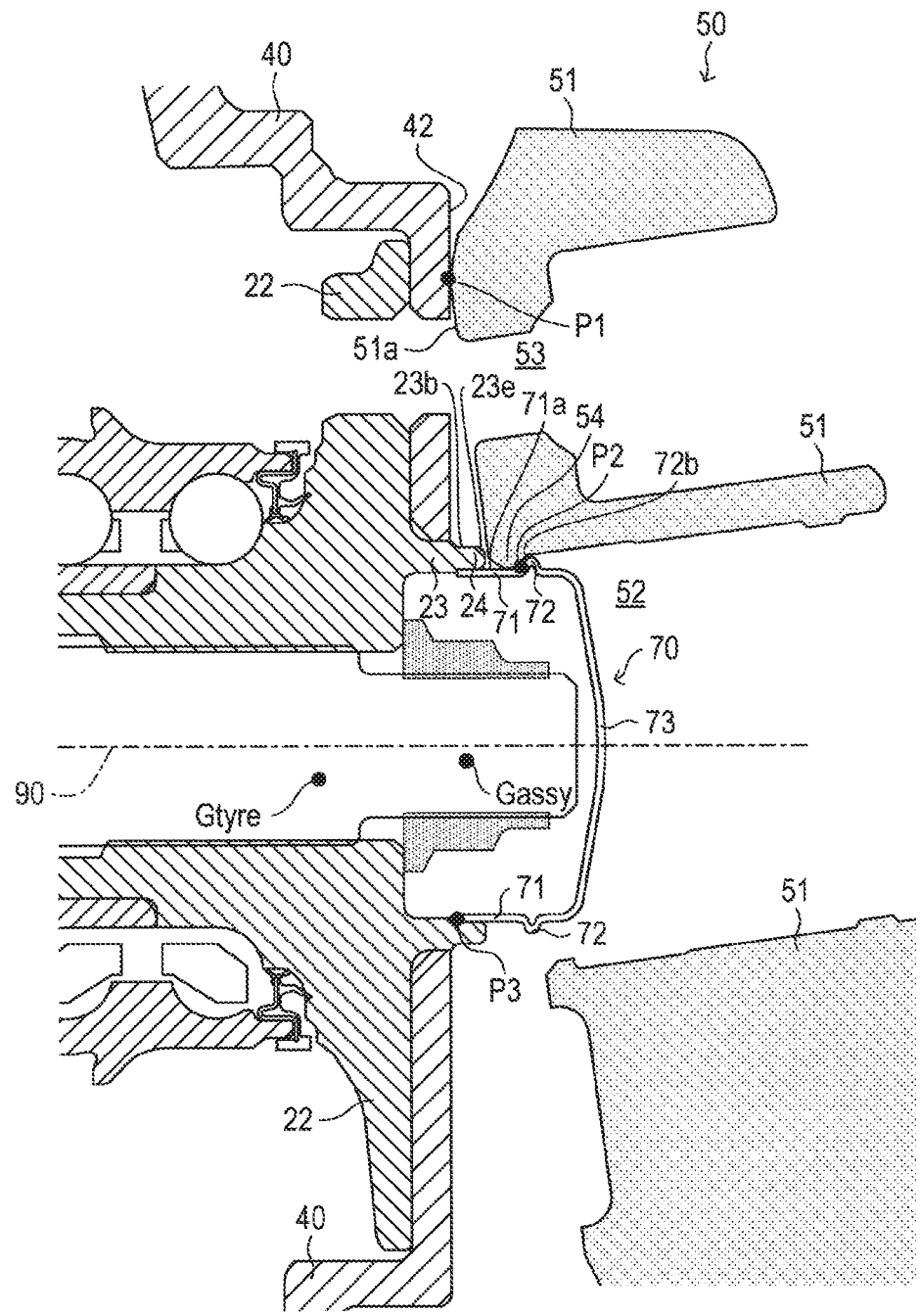
FIG. 5 is a sectional view for describing a state where all hub bolts are removed in the wheel mounting structure illustrated in FIG. 1.

When all the hub bolts 60 are removed, the spigot fitting part 24 is released under a weight of the wheel 50 and a weight of a tire (not shown; hereinafter also referred to as "wheel assembly") mounted to the wheel 50 to incline the wheel 50 as illustrated in FIG. 5. When the wheel 50 is inclined, the abutting surface (hub mounting surface) 51a against the disc rotor 40 is separated from the abutting surface 42 of the disc rotor 40. As a result, the annular protruding part 54 falls off the spigot joint part 23 to move onto the cap outer peripheral surface 71a. Then, the annular protruding part 54 is locked by the collar part 72 which is formed in a protruding fashion on the grease cap 70.

More specifically, the wheel 50 in the first embodiment is a so-called inset (plus-offset) wheel. Therefore, as illustrated in FIG. 1, a gravity center Gtyre of the tire is positioned on the inboard side with respect to the abutting surface (hub mounting surface) 51a of the wheel 50 against the disc rotor 40. Further, a gravity center Gassy of the wheel assembly is also positioned on the inboard side with respect to the hub mounting surface 51a.

Therefore, as a result of the removal of all the hub bolts 60, when the spigot fitting part 24 is released, a moment in a counterclockwise direction (leftward direction) is generated to incline the wheel 50 in the counterclockwise direction, as illustrated in FIG. 5. The hub mounting part 51 slides toward the rotation axis 90 while being held in contact with the abutting surface 42 of the disc rotor 40 at a point P1. At the same time, the annular protruding part 54 slides toward the outboard side while being held in contact with the spigot joint part 23 at a point P2 and then slides down on the second slope 23e to move onto the outer peripheral surface 71a of the grease cap 70.

Figure 6:
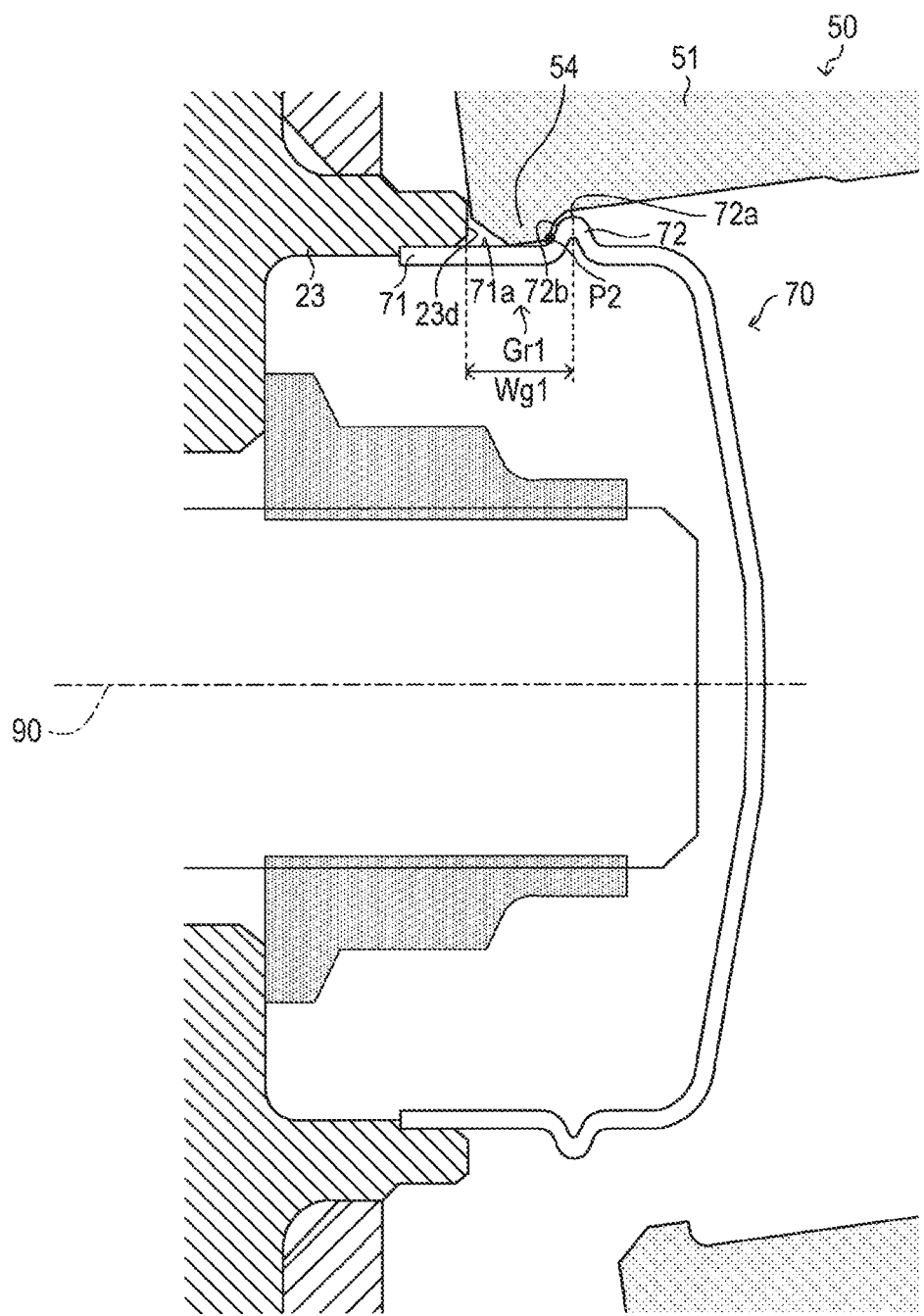
FIG. 6 is an enlarged sectional view of the spigot joint part, the annular protruding part, and the grease cap illustrated in FIG. 5.

At this time, the annular protruding part 54 is completely fitted into a groove Gr1 defined by the mating-part end 23d, the cap outer peripheral surface 71a, and an inboard-side slope 72b (hereinafter also referred to as "third slope 72b") of the collar part 72, as illustrated in FIG. 6. Specifically, the wheel 50 is supported by the grease cap 70 at the point P2 so that the wheel 50 (specifically, the wheel assembly) is prevented from falling off. In this manner, the annular protruding part 54 and the grease cap 70 having the collar part 72 form a wheel fall-off prevention mechanism. A width Wg1 of the groove Gr1 is defined as a distance between the mating-part end 23d and the top part 72a of the collar part 72 in the direction parallel to the rotation axis 90. The width Wg1 of the groove Gr1 is set so as to be equal to (approximately equal to) a sum Lt of a length Lb of the first side surface 54b, the length La of the protruding-part inner peripheral surface 54a, and a length Lc of the second side surface 54c of the annular protruding part 54 illustrated in FIG. 2 in the direction parallel to the rotation axis 90. The width Wg1 of the groove Gr1 is determined by restricting the press-fit depth of the grease cap 70 by the stepped part 23h of the spigot joint part 23. Therefore, the width Wg1 of the groove Gr1 is easily reproduced during assembly and maintenance of the wheel hub 20 and other works.

Figure 7:
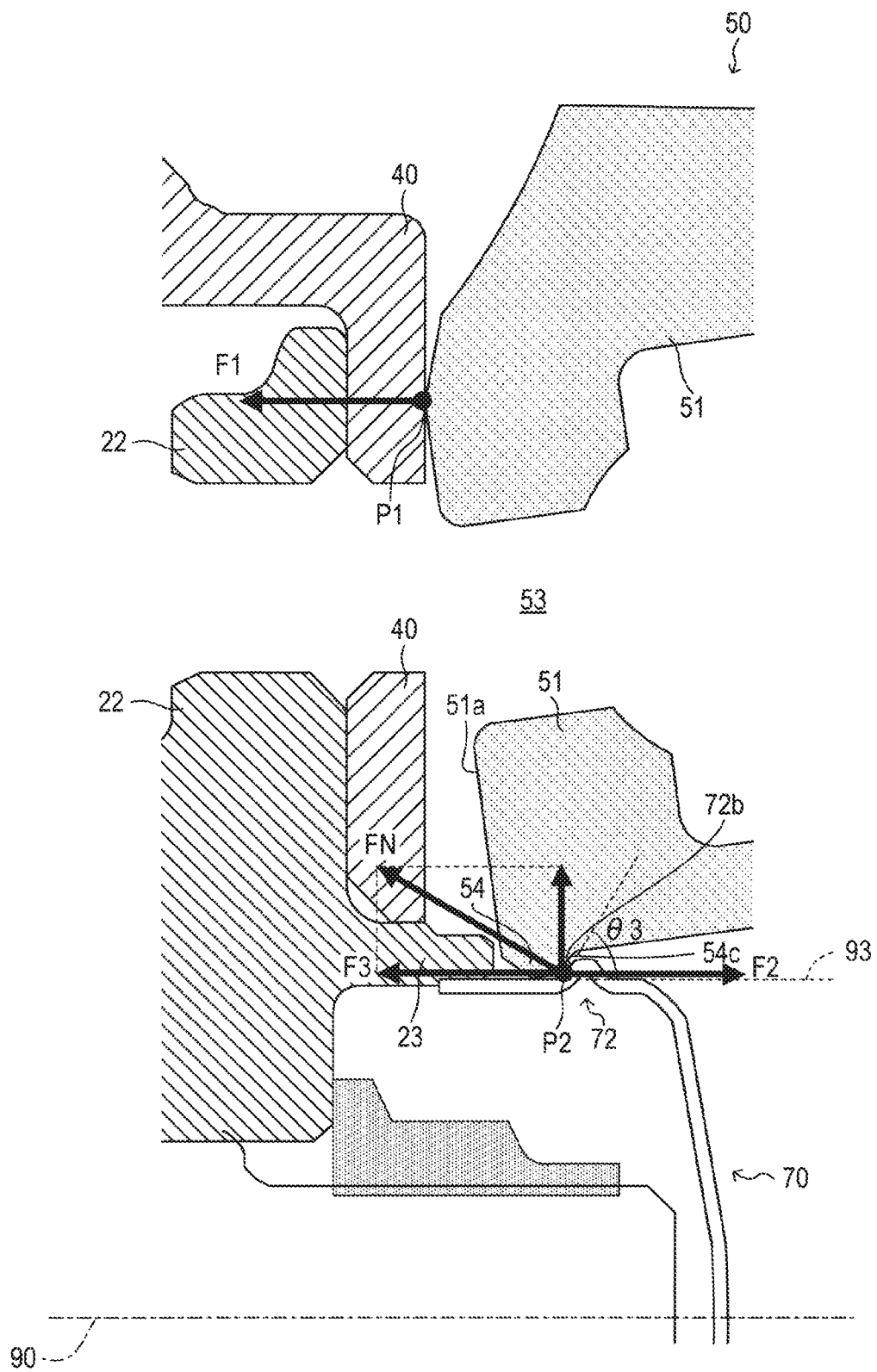
FIG. 7 is a view for describing a reaction force exerted on a disc rotor and a reaction force exerted on the grease cap when all the hub bolts are removed in the wheel mounting structure illustrated in FIG. 1.

Next, a reaction force exerted at the point P1 and a reaction force exerted at the point P2 when all the hub bolts 60 are removed are described referring to FIG. 7. A component (component toward the inboard side) F1 of the reaction force exerted to the disc rotor 40 in the direction of the rotation axis 90 by the wheel 50 at the point P1 and a component (component toward the outboard side) F2 of the reaction force exerted to the grease cap 70 in the direction of the rotation axis 90 by the annular protruding part 54 of the wheel 50 at the point P2 are in equilibrium.

The annular protruding part 54 and the collar part 72 mesh with each other at an abutting part between the second side surface 54c of the annular protruding part 54 and the third slope 72b of the collar part 72, specifically, at the point P2. When the reaction force F2 becomes larger than a component (component toward the inboard side) F3 of a force generated by the meshing in the direction of the rotation axis 90, however, the annular protruding part 54 crosses over the third slope 72b and slides on the cap outer peripheral surface 71a toward the outboard side. Finally, the annular protruding part 54 falls off the grease cap 70.

More specifically, the force F3 generated by the meshing at the point P2 is a component of a normal force FN acting on the third slope 72b in the direction of the rotation axis 90. Hereinafter, the force F3 generated by the meshing is also referred to as "drag F3". The drag F3 is mainly determined by the weight of the wheel assembly and a third inclination angle $\phi 3$ being an inclination angle (angle formed with a line 93 parallel to the rotation axis 90) of the third slope 72b. The normal force FN is proportional to the weight of the wheel assembly, whereas the drag F3 increases as the third inclination angle $\phi 3$ becomes larger. In the first embodiment, the third inclination angle $\phi 3$ is set to 60°. In this manner, a general wheel assembly can be prevented from falling off. The third inclination angle $\phi 3$ is set smaller than the angle $\phi 2$ (65°) of the second side surface 54c.

As described above, the width Wg1 of the groove Gr1 is set so as to be equal to (approximately equal to) the length Lt of the annular protruding part 54 in the direction parallel to the rotation axis 90. As a result, when the wheel slides to fall off the spigot joint part 23, the annular protruding part 54 is immediately locked by the collar part 72 of the grease cap 70.

When a width Wg of the groove is set larger than the width Wg1, in other words, when the collar part 72 is formed at a position on the outboard side with respect to the above-mentioned position, there is a fear in that the following problem arises. The width Wg of the groove in the above-mentioned supposition is hereinafter referred to as "Wg2". The width Wg2 is larger than the width Wg1. As the inclination of the wheel assembly increases, the component of the reaction force in the direction parallel to the rotation axis 90 increases. Therefore, a magnitude of the component of the reaction force exerted on the wheel in the direction parallel to the rotation axis 90 when the groove Wg of the groove is set to the width Wg2 is larger than a magnitude of the component of the reaction force exerted on the wheel in the direction parallel to the rotation axis 90 when the width Wg of the groove is set to the width Wg1.

Therefore, a prying force for the grease cap 70, which is generated when the width Wg of the groove is set to the width Wg2, is larger than a prying force for the grease cap 70, which is generated when the width Wg of the groove is set to the width Wg1. The "prying force" is a force for rotating the grease cap 70 in a counterclockwise direction about a point P3 (specifically, a point on the abutting surface 23g illustrated in FIG. 4, at which the abutting surface 23g is in contact with the cap end 74) illustrated in FIG. 5 as a fulcrum. When the width Wg of the groove is set to the width Wg2, there is a higher possibility in that the grease cap 70 may fall off the spigot joint part 23 due to the "prying force". Based on the above-mentioned facts, it is preferred that the width Wg of the groove be set as small as possible. Specifically, it is preferred that the collar part 72 be positioned as close as possible to the mating-part end 23d. As described above, in view of the fact that the annular protruding part 54 needs to be reliably locked to the groove Gr1, it is suitable to provide the collar part 72 at a position which allows the width Wg of the groove Gr1 to be equal to Wg1.

As described above, according to the first structure, the spigot joint part 23 which is formed to protrude from the hub axle part 21 of the wheel hub 20 to a vehicle-body outer side (outboard side) has the cylindrical outer peripheral surface 23b with the rotation axis 90 as the center axis and the cylindrical inner peripheral surface 23f with the rotation axis 90 as the center axis. The collared member 70, which is the cylindrical member and has the collar part 72 protruding radially outward, is inserted into and fixed to the cylindrical inner peripheral surface 23f from the vehicle-body outer side. The collar part 72 is formed at a position away from the mating-part end 23d by the predetermined distance Wg1 when the collared member 70 is inserted into and fixed to the spigot joint part 23.

The wheel 50 has the center hole 52 formed in the center of the wheel 50, which allows the spigot joint part 23 to be inserted therethrough, and the plurality of bolt holes 53 formed around the center hole 52, which allow the plurality of hub bolts 60 to be inserted therethrough. Further, the annular protruding part 54 which protrudes toward the center of the wheel is formed on the part of the inner peripheral surface of the center hole 52, which is positioned on the hub mounting surface side of the wheel. In addition, in the state where the wheel 50 is fixed to the flange part 22 by using the plurality of hub bolts 60, the fitting part 24 having the cylindrical outer peripheral surface 23b and the annular protruding part 54 are spigot-fitted. In the state where the fixing of the wheel 50 by using the plurality of hub bolts 60 is released, the annular protruding part 54 is locked by the collar part 72.

As described above, according to the first structure, in the wheel hub having the structure for fixing the wheel by fastening the plurality of hub bolts, the wheel can be prevented from falling off and/or the components can be prevented from being damaged during the wheel replacement. Thus, efficiency of the wheel replacement work can be improved.

Second Embodiment

A wheel mounting structure (hereinafter also referred to as "second structure") according to a second embodiment of the present invention differs from the first structure in that a cylindrical member obtained by excluding the lid part 73 of the grease cap 70 is adopted as the collared member in place of the grease cap 70.

Figure 8:
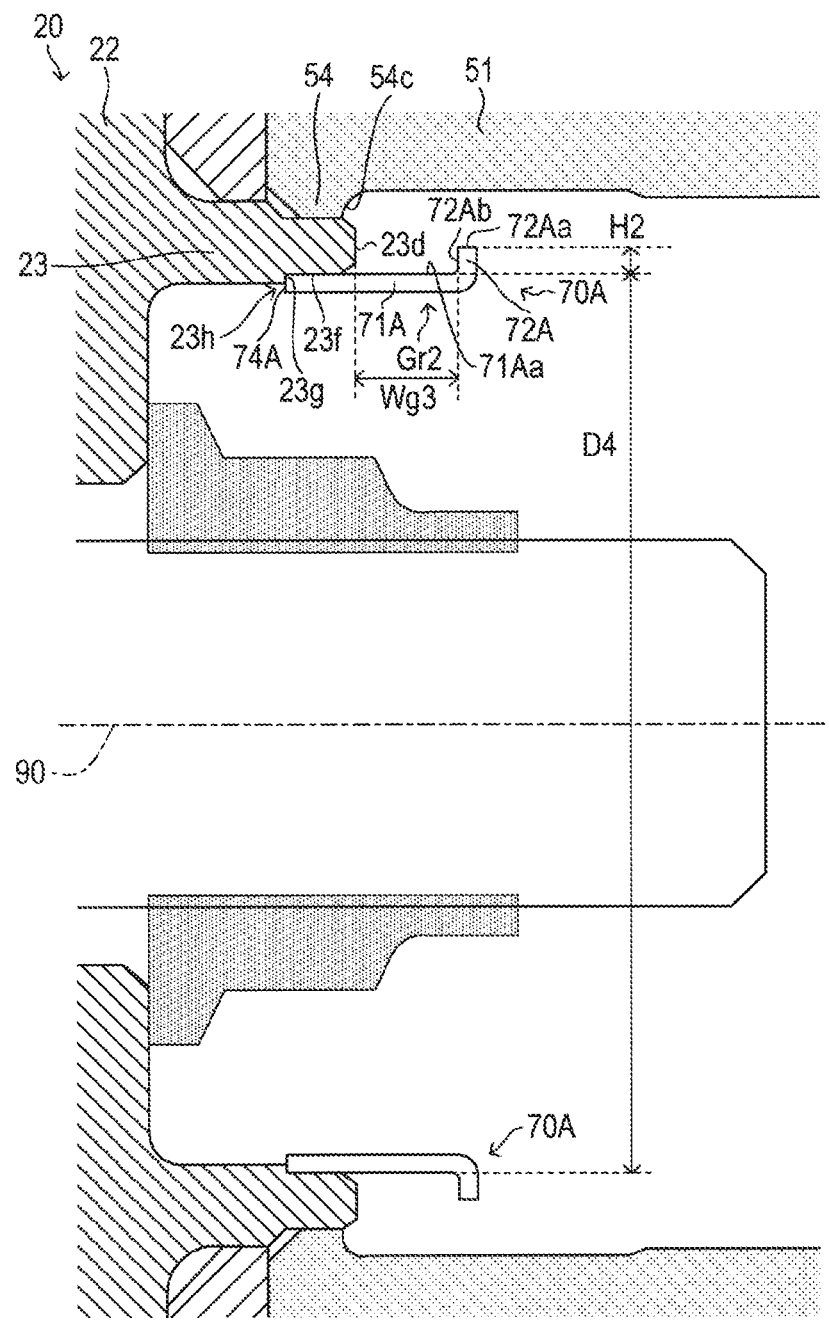
FIG. 8 is a sectional view for describing a wheel mounting structure (second structure) according to a second embodiment of the present invention.

As illustrated in FIG. 8, a ring 70A is a cylindrical member and includes a cylindrical part 71A and a collar part 72A. The cylindrical member 70A is hereinafter also referred to as "wheel fall-off prevention ring 70A" or simply as "ring 70A". The collar part 72A is formed to protrude outward from an outer peripheral surface (hereinafter also referred to as "ring outer peripheral surface") 71Aa of the cylindrical part 71A of the ring 70A in a radial direction of the cylindrical part 71A. The ring 70A is formed of a molten zinc-coated steel plate and is formed by press working. Further, the ring 70A is coated with epoxy resin-based coating. A diameter D4 of the ring 70A is approximately equal to the inner diameter D2 of the cylindrical inner peripheral surface 23f (for example, 60 mm). A height H2 (length along the radial direction from the ring outer peripheral surface 71Aa to a top part 72Aa of the collar part 72A) of the collar part 72A is 2.5 mm.

In FIG. 8, the ring 70A is press-fitted and fixed along the cylindrical inner peripheral surface 23f of the spigot joint part 23. When the ring 70A is press-fitted, an inboard-side end part 74A (hereinafter also referred to as "ring end 74A") is brought into abutment against the abutting surface 23g of the spigot joint part 23. Through the abutment of the ring end 74A against the abutting surface 23g, a press-fit depth of the ring 70A is restricted. The press-fit depth of the ring 70A is 5 mm which is equal to the length L2 of the cylindrical inner peripheral surface 23f.

When the ring 70A is press-fitted into and fixed to the spigot joint part 23, a groove Gr2 defined by the mating-part end 23d, the ring outer peripheral surface 71Aa, and a slope 72Ab (hereinafter also referred to as "fourth slope 72Ab") of the collar part 72A is formed. A width Wg3 of the groove Gr2 is set so as to be equal to (approximately equal to) the length Lt of the annular protruding part 54 in the direction parallel to the rotation axis 90.

Figure 9:
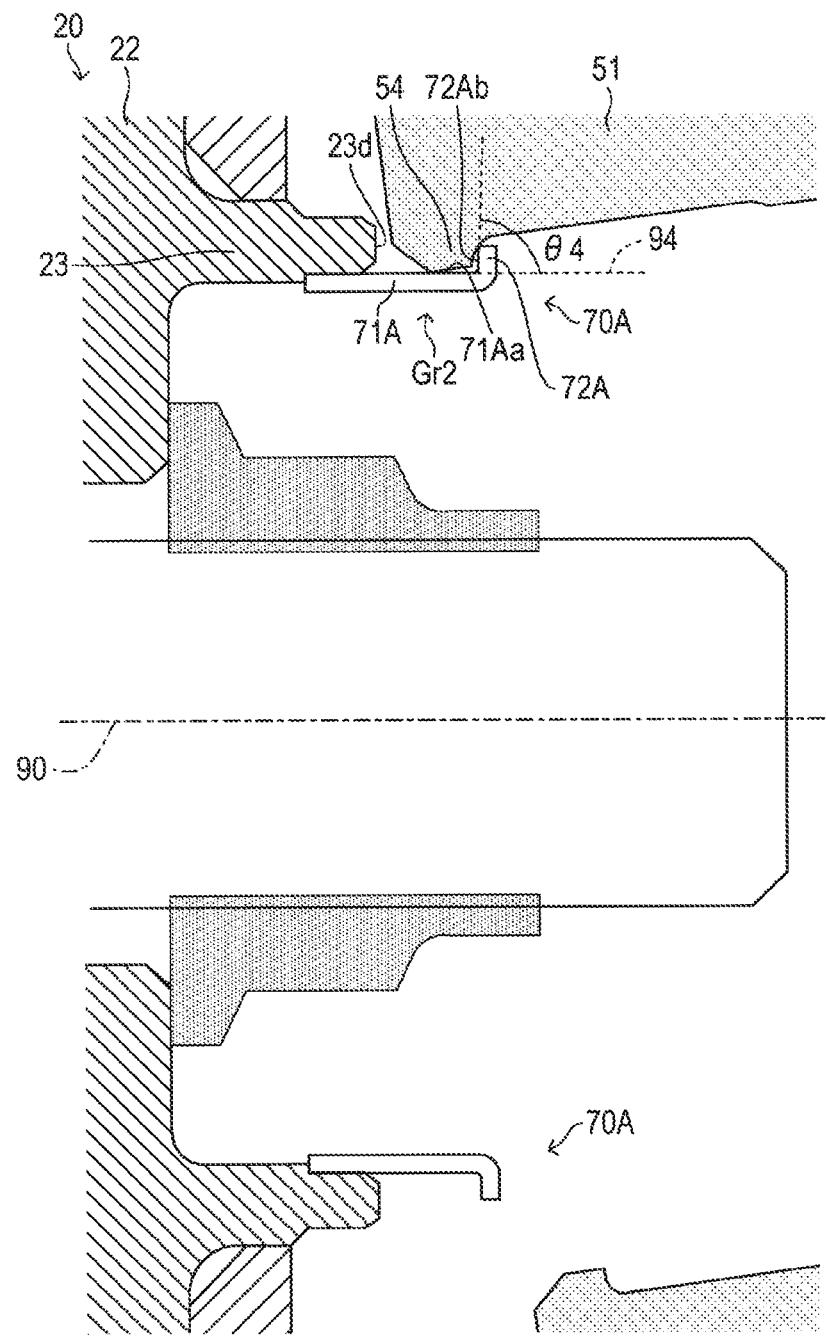
FIG. 9 is a sectional view for describing a state where all the hub nuts are removed in the wheel mounting structure illustrated in FIG. 8.

Therefore, as illustrated in FIG. 9, when the spigot-fitting is released in a state where all the plurality of hub bolts 60 are removed, the annular protruding part 54 falls off the spigot joint part 23 to be fitted into the groove Gr2 formed in the ring 70A.

A fourth inclination angle 94 which is an angle formed between the fourth slope 72Ab and a line 94 parallel to the rotation axis 90 is set to, for example, 90°. As described above, the second structure can easily achieve the wheel fall-off prevention mechanism by press-fitting and fixing the ring 70A to the spigot joint part 23 even in a vehicle which does not require the grease cap 70.

As described above, according to the second structure, in the wheel hub having the structure for fixing the wheel by fastening the plurality of hub bolts, the collared member is inserted into and fixed to the spigot joint part. As a result, the wheel can be prevented from falling off and/or the components can be prevented from being damaged during the wheel replacement even when the wheel hub does not require the grease cap. Thus, efficiency of the wheel replacement work can be improved.

MODIFICATION EXAMPLE

The present invention is not limited to the embodiment described above, and various modification examples can be adopted within the scope of the present invention as described above.

In the embodiments described above, the annular protruding part 54 is defined by the protruding-part inner peripheral surface 54a, the first side surface 54b, and the second side surface 54c and has a trapezoidal cross-sectional shape. However, each of a part between the protruding-part inner peripheral surface 54a and the first side surface 54b and a part between the protruding-part inner peripheral surface 54a and the second side surface 54c may be chamfered with a predetermined radius.

Figure 10:
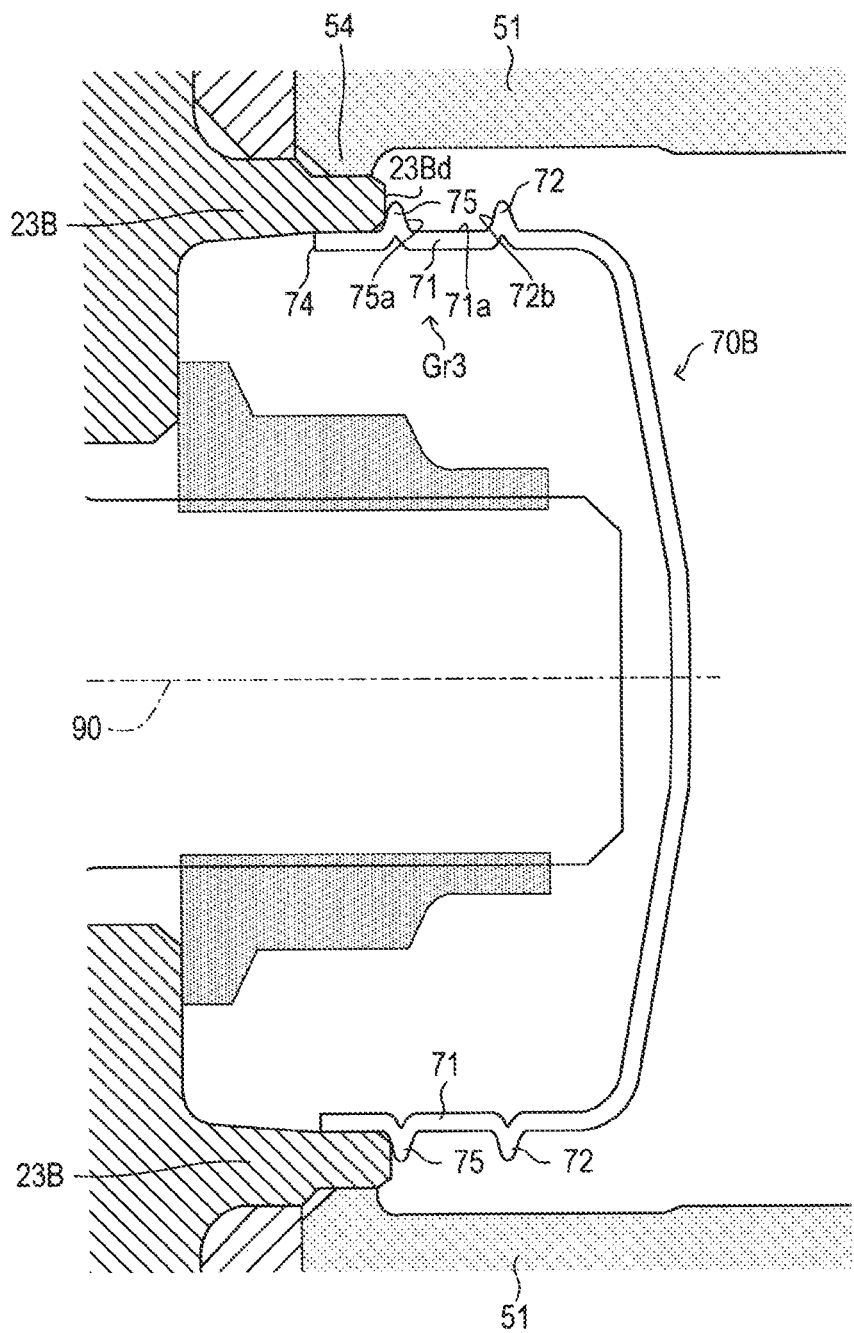
FIG. 10 is a sectional view for describing a grease cap having two collar parts in a modification example of the present invention.

The grease cap 70 has the collar part (hereinafter also referred to as "first collar part") 72 as illustrated in FIG. 10. In addition, another collar part (hereinafter also referred to as "second collar part") 75 configured to restrict a press-fit height (depth) of the grease cap 70 to the cylindrical inner peripheral surface 23f of the spigot joint part 23 may be formed to protrude. When a grease cap 70B including the first collar part 72 and the second collar part 75 is press-fitted into a spigot joint part 23B without a stepped part, the second collar part 75 is brought into abutment against a mating-part end 23Bd to restrict the press-fit height. In this example, the first collar part 72 is formed at a position so that, when the plurality of hub bolts 60 are removed and the annular protruding part 54 slides onto the grease cap 70, the annular protruding part 54 is completely fitted into a groove Gr3 defined by the slope 72b of the first collar part 72, the cap outer peripheral surface 71a, and a slope 75a of the second collar part 75. Therefore, in the structure including the second collar part 75, the abutting surface 23g and the stepped part 23h formed on the spigot joint part 23 in the first structure and the second structure are not required.

The fourth inclination angle θ4 in the second structure is set to 90°. However, the fourth inclination angle θ4 may be set to 60° which is the same as the third inclination angle θ3 in the first structure.

The collar part 72 in the first structure is formed by the press working. However, the collar part 72 may be formed by cutting a cylindrical part having a large thickness or by welding or brazing an annular member onto an outer peripheral surface of a cylindrical part.

The disc rotor 40 is used in the first structure and the second structure described above. However, a form and a shape of a brake do not particularly limit the present invention, and a drum may be used in place of the disc rotor 40.

What is claimed is:

1. A wheel mounting structure configured to mount a wheel to a wheel hub for a vehicle,
the wheel hub comprising:
a hub axle part;
a flange part being a disc-shaped part extending from the hub axle part in parallel to a plane perpendicular to a rotation axis of the wheel hub, the flange part having a fixing surface configured to fix the wheel by using a plurality of hub bolts on a vehicle-body outer side of the vehicle; and
a spigot joint part being a part having a cylindrical shape with the rotation axis as a center axis, which is formed to protrude from the hub axle part to the vehicle-body outer side with respect to the flange part,
wherein the spigot joint part has a cylindrical outer peripheral surface with the rotation axis as a center axis and a cylindrical inner peripheral surface with the rotation axis as a center axis.
wherein a collared member being a member having a cylindrical shape, which has a collar part formed to protrude outward in a radial direction of the collared member, is inserted into and fixed to the cylindrical inner peripheral surface from the vehicle-body outer side, and the collar part is formed at a position separated from an end part of the spigot joint part by a predetermined distance when the collared member is inserted into and fixed to the spigot joint part,
wherein the wheel has:
a center hole formed in a center of the wheel to allow the spigot joint part to be inserted therethrough;
a plurality of bolt holes formed around the center hole to allow the plurality of hub bolts to be inserted therethrough; and
an annular protruding part formed on a part of an inner peripheral surface of the center hole, which is positioned on a hub mounting surface side of the wheel, to protrude toward the center of the wheel, wherein a fitting part having the cylindrical outer peripheral surface and the annular protruding part are spigot-fitted in a state where the wheel is fixed to the flange part by using the plurality of hub bolts, and wherein the annular protruding part is locked by the collar part in a state where the fixing of the wheel by using the plurality of hub bolts is released.

2. A wheel mounting structure according to claim 1, wherein the predetermined distance is set so as to be equal to a length of the annular protruding part in a direction of the rotation axis.

3. A wheel mounting structure according to claim 1, wherein a stepped part is formed at a vehicle-body inner side end of the cylindrical inner peripheral surface, and the predetermined distance is set by bringing the collared member into abutment against the stepped part.

4. A wheel mounting structure according to claim 2, wherein a stepped part is formed at a vehicle-body inner side end of the cylindrical inner peripheral surface, and the predetermined distance is set by bringing the collared member into abutment against the stepped part.

5. A wheel mounting structure according to claim 1, wherein the collared member is press-fitted into and fixed to the cylindrical inner peripheral surface.

6. A wheel mounting structure according to claim 2, wherein the collared member is press-fitted into and fixed to the cylindrical inner peripheral surface.

7. A wheel mounting structure according to claim 3, wherein the collared member is press-fitted into and fixed to the cylindrical inner peripheral surface.

8. A wheel mounting structure according to claim 4, wherein the collared member is press-fitted into and fixed to the cylindrical inner peripheral surface.

9. A wheel mounting structure according to claim 1, wherein the collared member comprises a grease cap.

10. A wheel mounting structure according to claim 2, wherein the collared member comprises a grease cap.

11. A wheel mounting structure according to claim 3, wherein the collared member comprises a grease cap.

12. A wheel mounting structure according to claim 4, wherein the collared member comprises a grease cap.

13. A wheel mounting structure according to claim 8, wherein the collared member comprises a grease cap.

* * * * *